H. G. SARBACH.
VEHICLE WHEEL.
APPLICATION FILED AUG. 7, 1911.

1,066,953.

Patented July 8, 1913.

Witnesses:
Chas. Albatt
G. K. Smith

Inventor
Henry G. Sarbach,
By Albert H. Bates,
Att'y.

UNITED STATES PATENT OFFICE.

HENRY G. SARBACH, OF CLEVELAND, OHIO.

VEHICLE-WHEEL.

1,066,953.  Specification of Letters Patent.  Patented July 8, 1913.

Application filed August 7, 1911. Serial No. 642,738.

*To all whom it may concern:*

Be it known that I, HENRY G. SARBACH, a citizen of the United States, residing at Cleveland, in the county of Cuyahoga and State of Ohio, have invented a certain new and useful Improvement in Vehicle-Wheels, of which the following is a full, clear, and exact description, reference being had to the accompanying drawings.

The object of this invention is to provide a very simple and efficient spring wheel for vehicles of various types, as automobiles, etc.

My wheel is very simple in construction and is designed to be very effective in practice.

It comprises an outer member and tread portion, an inner portion carrying the hub, spokes and inner rim, and a series of intermediate springs so arranged between the two portions that the strain is distributed over a large number of springs. The springs are of peculiar form, being leaf springs bent so as to seat one upon another, whereby each spring assists in holding the adjacent spring in place.

The invention is hereinafter more fully explained and the essential characteristics set out in the claims.

Figure 1:
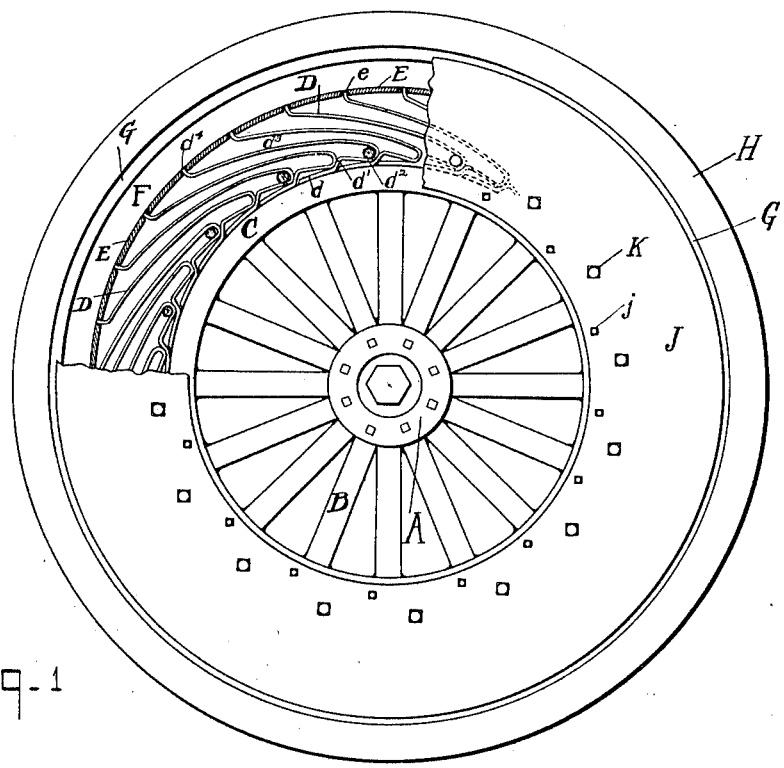
Figure 2:
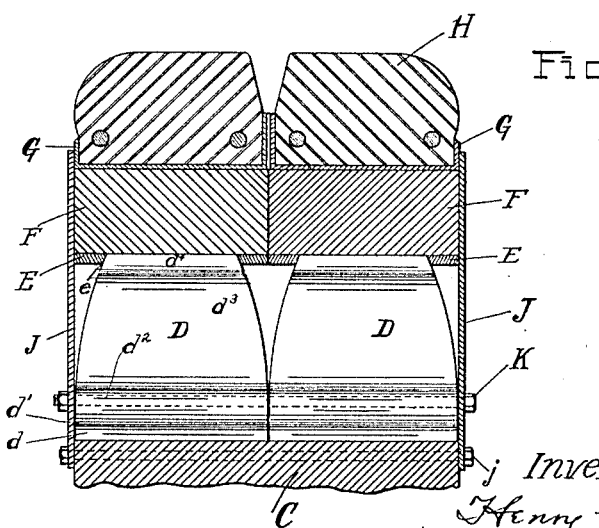

In the drawings, Figure 1 is a side elevation, partly broken away, of my wheel; Fig. 2 is an enlarged radial section through the outer rim, the spring and the rim of the inner portion.

As shown in the drawings, A represents the hub, B the spokes and C the inner rim of the wheel. These parts may be of any approved construction.

Around the outside of the inner rim C are arranged one or more series of springs D. As shown, there are two series side by side. Each spring is a leaf spring of the peculiar form shown in Fig. 1, having a portion $d$ adapted to rest on the outer periphery of the rim C, then a portion $d^1$ bent outwardly, and then a portion bent diagonally toward the inner rim and rounded at $d^2$, from whence projects in the opposite direction a long, comparatively flat portion $d^3$, the extreme end $d^4$ of the spring being bent somewhat abruptly so that it projects substantially radial or at right angles to the portion $d$. It will be seen that when the springs are in place about the inner rim C they nest, one within the other, the return bend $d^2$ of each spring bearing against the shoulder $d^1$ of the adjacent spring. The outer end $d^4$ of the springs are connected with the outer rim portion, which will now be described.

Where two sets of springs D are employed, there are preferably two outer rim portions side by side. This enables a better spring action on irregular roads, besides enabling the wheel to obtain a better tractive hold. As shown, there are two outer rim members F side by side. On the inner periphery of these rims are a pair of metallic rings E having transverse slots $e$ occupied by the outwardly bent ends $d^4$ of the springs D. On the outer sides of the rims F are channel-shaped rings G, each of which is shown as occupied by a rubber tire or tread H.

It will be seen that the weight of the vehicle axle tending to depress the hub bends inwardly the springs below the hub and outwardly on the springs above the hub. The springs in front and behind the hub are bent intermediately of their long arm by reason of the tendency given them to buckle. Accordingly, the strain is taken entirely around the wheel. This enables the springs to be comparatively light and still carry the necessary load.

The springs are effectively retained in place by a pair of annular side plates J extending from the inner to the outer rim and bolted to one of these rims. As shown, they are bolted at $j$ to the inner rim. Extending through the side plates J at suitable intervals are bolts K which rest in the return bends of the springs, effectively holding them in place. As shown, these bolts K are only provided for alternate springs, as it is not deemed necessary to secure each spring in this manner, since each spring is held by the adjacent spring. It will be seen that the removal of either of the plates J enables the removal of any spring which may become broken.

Having thus described my invention, what I claim is:—

1. In a vehicle wheel, the combination of an inner and an outer rim, an endless series of two-legged bent leaf springs between them arranged to nest one upon the other, each spring having its outer leg connected to the outer rim and its inner leg provided with a hump against which the bend connecting the legs of the adjacent spring bears.

2. In a vehicle wheel, the combination, with the inner and outer rim portions, of an endless annular series of approximately U-shaped springs between the rims, each spring having its outer leg connected to the outer rim and its inner leg formed with a shoulder against which the return bend of the next spring rests.

3. In a vehicle wheel, the combination, with the inner and the outer rims, of an endless annular series of U-shaped springs between them, said springs having their inner legs against the main rim and their outer legs against the outer rim, annular plates secured to one rim outside of the springs, and retaining bars extending crosswise of the wheel from one plate to the other and occupying the U-bends of certain springs.

4. In a vehicle wheel, the combination of an inner ring and an outer ring, and resilient driving means disposed between said rings, said means consisting of a series of approximately U-shaped springs, each spring having the end of its outer leg attached to the outer ring and its inner leg against the inner ring, the inner leg having an intermediate hump against which the bend of the adjacent spring stands, the said inner leg having its portion beyond the hump lying between the adjacent spring and the inner ring.

5. In a vehicle wheel, the combination, with the inner and outer rim portions, of an endless annular series of approximately U-shaped springs between the rims, each spring being formed with a shoulder against which the return bend of the next spring rests, annular side plates, and cross rods carried thereby and occupying U-bends of the springs on the opposite side of such bends from the shoulder of the adjacent spring against which the bend rests.

6. In a vehicle wheel, the combination, with the inner and outer rim portions, of an annular series of approximately U-shape leaf springs between the two rim portions, each spring having its outer leg connected with the outer rim and having its inner leg bent with a shoulder, the extreme portion of the leg beyond the shoulder bearing against the shoulder of the inner leg of the adjacent spring, two annular plates bridging the space from one rim to the other, and cross bolts connected with said plates and occupying U-bends of the springs.

7. In a vehicle wheel, the combination of an inner portion comprising a hub, spokes and rim, an outer portion comprising a rim with an exterior tread, an annular series of U-shaped springs between the two portions, said springs having their inner legs against the main rim and their outer legs against the outer rim, the U-bend of one spring extending between the two legs of the adjacent spring, annular side plates secured to one of the rims, and cross bolts extending through the side plates and the U-bends of certain springs.

8. In a vehicle wheel, the combination of an inner rim, two disconnected outer rims side by side, and two annular series of U-shaped springs side by side, each spring having its inner leg bearing against the inner rim and its outer leg against the corresponding outer rim, whereby the two outer rims are independent of each other, the inner leg of each spring having an intermediate hump against which the return bend of the adjacent spring bears, and a pair of annular side plates overlapping the two rims and secured to the inner rim and retaining the two sets of springs between them.

9. In a vehicle wheel, the combination of an inner portion comprising a rim, spokes and hub, a pair of annular side plates secured to the said rim, two outer rim portions side by side between the side plates, each outer rim portion having an individual tire portion, two series of U-shaped springs side by side between the two side plates, each spring having its inner leg bearing against the inner rim and its outer leg bearing against the respective outer rim, and a series of cross bolts carried by the two annular plates and occupying the U-bends of certain springs, each spring having its inner leg bent to form its shoulder, and the U-bends of the adjacent spring resting against such shoulder.

In testimony whereof, I hereunto affix my signature in the presence of two witnesses.

HENRY G. SARBACH.

Witnesses:
ALBERT H. BATES,
BRENNAN B. WEST.

---

Copies of this patent may be obtained for five cents each, by addressing the "Commissioner of Patents, Washington, D. C."